US010911249B2

United States Patent
Qiu

(10) Patent No.: US 10,911,249 B2
(45) Date of Patent: Feb. 2, 2021

(54) METHOD, APPARATUS, AND ELECTRONIC DEVICE FOR COMMUNICATION BETWEEN BLOCKCHAIN NODES, AND METHOD, APPARATUS, AND ELECTRONIC DEVICE FOR BLOCKCHAIN-BASED CERTIFICATE MANAGEMENT

(71) Applicant: Advanced New Technologies Co., Ltd., George Town (KY)

(72) Inventor: Honglin Qiu, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 16/720,647

(22) Filed: Dec. 19, 2019

(65) Prior Publication Data
US 2020/0127857 A1    Apr. 23, 2020

Related U.S. Application Data

(63) Continuation of application No. 16/040,347, filed on Jul. 19, 2018.

(30) Foreign Application Priority Data

Jul. 26, 2017   (CN) ........................... 2017 1 0617599

(51) Int. Cl.
 *H04L 9/32*    (2006.01)
 *G06F 21/64*    (2013.01)
(Continued)

(52) U.S. Cl.
 CPC ............ *H04L 9/3268* (2013.01); *G06F 21/64* (2013.01); *H04L 9/0637* (2013.01);
(Continued)

(58) Field of Classification Search
 CPC .. H04L 9/3268; H04L 63/0823; H04L 9/0637; H04L 2209/38; G06F 21/64; G06Q 2220/00
See application file for complete search history.

(56) References Cited

U.S. PATENT DOCUMENTS 8,572,368 B1 * 10/2013 Deacon ................... G06F 21/64
                                                                    713/158
2004/0064693 A1 * 4/2004 Pabla .................... H04L 67/104
                                                                    713/168
(Continued)

FOREIGN PATENT DOCUMENTS

CN    106385315    2/2017
CN    106504091    3/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Matthew Smithers
(74) *Attorney, Agent, or Firm* — Fish & Richardson P.C.

(57) ABSTRACT

A first communication request including a digital certificate of a first node sent from the first node in a blockchain is received at a second node in the blockchain, where the digital certificate of the first node is stored in the blockchain. Certificate validity information stored in the blockchain and associated with the nodes in the blockchain is accessed by the second node based on the first communication request, where the certificate validity information reflects the validity status information of digital certificates of the nodes in the blockchain. A verification of whether the digital certificate of the first node is valid is performed by the second node based on the first communication request and the accessed
(Continued)

certificate validity information. A communication connection to the first node is established by the second node in response to verifying that the digital certificate of the first node is valid.

15 Claims, 11 Drawing Sheets

(51) Int. Cl.
  *H04L 29/06* (2006.01)
  *H04L 9/06* (2006.01)
(52) U.S. Cl.
  CPC ..... *H04L 63/0823* (2013.01); *G06Q 2220/00* (2013.01); *H04L 2209/38* (2013.01)

(56) References Cited

U.S. PATENT DOCUMENTS

| | | | | |
|---|---|---|---|---|
| 2006/0137006 | A1* | 6/2006 | Ramzan | G06F 21/33 726/21 |
| 2007/0234046 | A1 | 10/2007 | Ishiyama | |
| 2008/0013537 | A1* | 1/2008 | Dewey | H04L 63/0823 370/390 |
| 2010/0192202 | A1* | 7/2010 | Ker | H04L 63/101 726/4 |
| 2015/0318997 | A1 | 11/2015 | Kobayashi et al. | |
| 2017/0180354 | A1 | 6/2017 | Falk et al. | |
| 2017/0330179 | A1 | 11/2017 | Song et al. | |
| 2017/0330180 | A1 | 11/2017 | Song et al. | |
| 2017/0338967 | A1* | 11/2017 | Lewison | H04L 9/14 |
| 2018/0101701 | A1* | 4/2018 | Barinov | H04L 9/3265 |
| 2018/0115520 | A1* | 4/2018 | Neuman | H04L 63/0272 |
| 2018/0137512 | A1 | 5/2018 | Georgiadis et al. | |
| 2018/0294977 | A1* | 10/2018 | Uhr | G06Q 20/38215 |
| 2019/0005470 | A1* | 1/2019 | Uhr | G06Q 20/401 |
| 2019/0036711 | A1* | 1/2019 | Qiu | H04L 9/3268 |
| 2019/0089717 | A1* | 3/2019 | Dolev | H04L 9/0866 |
| 2019/0268466 | A1* | 8/2019 | Inoue | H04L 9/3247 |
| 2019/0354977 | A1* | 11/2019 | Tang | H04L 63/12 |

FOREIGN PATENT DOCUMENTS

| | | |
|---|---|---|
| CN | 106789090 | 5/2017 |
| CN | 106972931 | 7/2017 |
| JP | 2006154125 | 6/2006 |
| JP | 2007267296 | 10/2007 |
| JP | 2014033395 | 2/2014 |
| JP | 2017506859 | 3/2017 |
| WO | WO 2017065389 | 4/2017 |
| WO | WO 2014108993 | 7/2017 |

OTHER PUBLICATIONS

International Preliminary Report on Patentability in International Application No. PCT/US2018/043919, dated Oct. 11, 2019, 25 pages.
International Search Report and Written Opinion of the International Searching Authority issued in International Application No. PCT/US2018/043919 dated Sep. 26, 2018; 11 pages.
Nakamoto, "Bitcoin: A Peer-to-Peer Electronic Cash System," www.bitcoin.org, 2005, 9 pages.
Wikipedia [Online], "Blockchain," Jul. 2017, [Retrieved on Sep. 30, 2019], retrieved from: URL<https://en.wikipedia.org/w/index.php?title=blockchain&oldid=792179103>, 8 pages.
Wirdum, "BIP 151: The End-To-End Encryption Bitcoin Never Had—But Soon Will", Bitcoin Magazine, [online], Jun. 2016, Internet <URL:https://bitcoinmagazine.com/articles/bip-the-end-to-end-eneryption-bitcoin-never-had-but-soon-will-1465401187>, Nov. 30, 2020.

* cited by examiner

US 10,911,249 B2

METHOD, APPARATUS, AND ELECTRONIC DEVICE FOR COMMUNICATION BETWEEN BLOCKCHAIN NODES, AND METHOD, APPARATUS, AND ELECTRONIC DEVICE FOR BLOCKCHAIN-BASED CERTIFICATE MANAGEMENT

CROSS-REFERENCE TO RELATED APPLICATIONS

This application is a continuation of U.S. patent application Ser. No. 16/040,347, filed Jul. 19, 2018, claims priority to Chinese Patent Application No. 201710617599.7, filed on Jul. 26, 2017, which is hereby incorporated by reference in its entirety.

TECHNICAL FIELD

The present application relates to the field of computer technologies, and in particular, to a method, an apparatus, and an electronic device for communication between blockchain nodes, and a method, an apparatus, and an electronic device for blockchain-based digital certificate management.

BACKGROUND

With the development of computer technologies, a blockchain technology (also referred to as a distributed ledger technology) is favored for advantages such as decentralization, openness and transparency, tamper-resistance, and dependability, and therefore, is widely applied to many fields, for example, intelligent contracting, securities transaction, e-commerce, the Internet of Things, social communications, file storage, existence proving, identity authentication, and equity crowdfunding.

Currently, blockchain systems mainly fall into three types: a public blockchain, a private blockchain, and a consortium blockchain. These three types of blockchains mainly differ in open objects. The public blockchain is open to everyone. The private blockchain is open to a single individual, entity, or organization. The consortium blockchain is open to a particular individual, entity, or organization, and is not open to other individuals, entities, or organizations.

In the blockchain, especially in the consortium blockchain for the particular organization, to improve communication security, a certificate authority center (CA center) is usually designed to issue a node certificate to each node that joins in blockchain communication, so that only nodes that hold valid certificates can communicate with each other. In some implementations, a node certificate that is issued and information related to certificate validity, for example, a certificate revocation list, are stored in a server in the CA center. When nodes in the blockchain need to communicate with each other, the information that is stored in the CA center and that is related to certificate validity is invoked and queried, so as to confirm the validity of the certificate and complete verification of a communication process. Main disadvantages of the method are as follows:

Secure communication among blockchain nodes depends on verification of the validity of the node certificate when a communication connection is established. Once the CA center is hacked, the hacker can arbitrarily modify the information related to the certificate validity. For example, the hacker can tamper with the certificate revocation list and restore a revoked certificate back to normal. The hacker can further use these previously revoked certificates to join in the blockchain without being authorized, and the node in the blockchain confirms the certificate validity based on the information that is tampered with, which threatens the security of the blockchain.

SUMMARY

Implementations of the present application provide a method, an apparatus, and an electronic device for communication between blockchain nodes, and a method, an apparatus, and an electronic device for blockchain-based digital certificate management, so as to improve security of communication between blockchain nodes and further improve security of a blockchain network.

The following technical solutions are used in the implementations of the present application.

According to a first aspect, an implementation of the present application provides a method for communication between blockchain nodes, including: receiving, by a second node, a first communication request sent by a first node, where the first communication request includes a digital certificate of the first node, and the digital certificate of the first node is stored in a blockchain that includes the first node and the second node; verifying, by the second node based on the first communication request and certificate validity information, whether the digital certificate of the first node is valid, where the certificate validity information is stored in the blockchain, and is used to reflect validity status information of a digital certificate of a node; and when the digital certificate of the first node is valid, determining, by the second node, whether to establish a communication connection to the first node.

Preferably, the method for communication between blockchain nodes provided in the first aspect further includes: sending, by the second node, a second communication request to the first node, where the second communication request includes a digital certificate of the second node, so that the first node verifies, based on the second communication request and the certificate validity information, whether the digital certificate of the second node is valid; and when the digital certificate of the first node is valid, the determining, by the second node, whether to establish a communication connection to the first node includes: when the digital certificate of the first node is valid and the first node verifies that the digital certificate of the second node is valid, establishing, by the second node, the communication connection to the first node.

Preferably, in the method for communication between blockchain nodes provided in the first aspect, the certificate validity information records an invalid digital certificate that is revoked, and the verifying, by the second node based on the first communication request and certificate validity information, whether the digital certificate of the first node is valid includes: determining, by the second node, the digital certificate of the first node based on the first communication request; verifying, by the second node based on the certificate validity information stored in the blockchain, whether the digital certificate of the first node is recorded in the certificate validity information; and if the digital certificate of the first node is recorded in the certificate validity information, verifying that the digital certificate of the first node is invalid.

Preferably, in the method for communication between blockchain nodes provided in the first aspect, the certificate validity information records a valid digital certificate, and the verifying, by the second node based on the first communication request and certificate validity information, whether the digital certificate of the first node is valid includes: determining, by the second node, the digital certificate of the first node based on the first communication request; verifying, by the second node based on the certificate validity information stored in the blockchain, whether the digital certificate of the first node is recorded in the certificate validity information; and if the digital certificate of the first node is recorded in the certificate validity information, verifying that the digital certificate of the first node is valid.

Preferably, before the receiving, by a second node, a first communication request sent by a first node, the method for communication between blockchain nodes provided in the first aspect further includes: storing, by writing the digital certificate of the first node into the blockchain, the digital certificate of the first node in the blockchain that includes the first node and the second node.

Preferably, in the method for communication between blockchain nodes provided in the first aspect, the certificate validity information is determined based on a revoked invalid digital certificate and/or a valid digital certificate that is received by the blockchain.

Preferably, in the method for communication between blockchain nodes provided in the first aspect, the first communication request received by the second node is sent by the first node based on the Secure Sockets Layer (SSL) protocol or the Transport Layer Security (TLS) protocol.

According to a second aspect, an implementation of the present application provides a method for blockchain-based digital certificate management, including: receiving a digital certificate of a node and validity status information of the digital certificate that are sent by a CA center; determining, based on the validity status information of the digital certificate, certificate validity information used to reflect the validity status information of the digital certificate; and storing the digital certificate and the certificate validity information in a blockchain, where the digital certificate and the certificate validity information are used to verify, after a second node in the blockchain receives a first communication request sent by a first node, whether a digital certificate of the first node that is included in the first communication request is valid.

Preferably, the method for blockchain-based digital certificate management provided in the second aspect further includes: sending, by the first node in the blockchain, a certificate application request to a CA center, where the certificate application request includes application information of the first node and is used to apply to the CA center for the digital certificate of the first node.

According to a third aspect, an implementation of the present application provides a method for blockchain-based digital certificate management, including: sending a digital certificate of a node in a blockchain and validity status information of the digital certificate to the blockchain, so that the blockchain determines, based on the validity status information of the digital certificate, certificate validity information used to reflect the validity status information of the digital certificate, and stores the digital certificate and the certificate validity information, so as to verify, after a second node in the blockchain receives a first communication request sent by a first node, whether a digital certificate of the first node that is included in the first communication request is valid.

Preferably, the method for blockchain-based digital certificate management provided in the third aspect further includes: receiving a certificate application request sent by the node in the blockchain, where the certificate application request includes application information of the first node and is used to apply to a CA center for the digital certificate of the first node; receiving and reviewing the application information of the first node; and when the application information of the first node passes the review, issuing the digital certificate to the first node, where validity status information of the digital certificate is validity.

According to a fourth aspect, an implementation of the present implementation provides an apparatus for communication between blockchain nodes. The apparatus is applied to a second node in a blockchain and includes: a communication request receiving module, configured to receive a first communication request sent by a first node, where the first communication request includes a digital certificate of the first node, and the digital certificate of the first node is stored in a blockchain that includes the first node and the second node; a validity verification module, configured to verify, based on the first communication request and certificate validity information, whether the digital certificate of the first node is valid, where the certificate validity information is stored in the blockchain, and is used to reflect validity status information of a digital certificate of a node; and a communication connection establishment module, configured to: when the digital certificate of the first node is valid, determine whether to establish a communication connection to the first node.

Preferably, the apparatus for communication between blockchain nodes provided in the fourth aspect further includes: a communication request sending module, configured to send a second communication request to the first node, where the second communication request includes a digital certificate of the second node, so that the first node verifies, based on the second communication request and the certificate validity information, whether the digital certificate of the second node is valid; and the communication connection establishment module is specifically configured to: when the digital certificate of the first node is valid and the first node verifies that the digital certificate of the second node is valid, establish the communication connection to the first node.

According to a fifth aspect, an implementation of the present application provides an electronic device. The electronic device is applied to a second node in a blockchain and includes: a processor; and a memory, configured to store a computer executable instruction, where the executable instruction is executed by the processor to perform the following operations: receiving a first communication request sent by a first node, where the first communication request includes a digital certificate of the first node, and the digital certificate of the first node is stored in a blockchain that includes the first node and the second node; verifying, based on the first communication request and certificate validity information, whether the digital certificate of the first node is valid, where the certificate validity information is stored in the blockchain, and is used to reflect validity status information of a digital certificate of a node; and when the digital certificate of the first node is valid, determining whether to establish a communication connection to the first node.

Preferably, in the electronic device provided in the fifth aspect, the executable instruction is executed by the processor to further perform the following operations: sending a second communication request to the first node, where the second communication request includes a digital certificate of the second node, so that the first node verifies, based on the second communication request and the certificate validity information, whether the digital certificate of the second node is valid; and when the digital certificate of the first node is valid and the first node verifies that the digital certificate of the second node is valid, establishing, by the second node, the communication connection to the first node.

According to a sixth aspect, an implementation of the present application provides an apparatus for blockchain-based digital certificate management. The apparatus is applied to a blockchain and includes: a certificate information receiving module, configured to receive a digital certificate of a node and validity status information of the digital certificate that are sent by a CA center; a certificate validity information determining module, configured to determine, based on the validity status information of the digital certificate, certificate validity information used to reflect validity status information of the digital certificate; and a storage module, configured to store the digital certificate and the certificate validity information in the blockchain, where the digital certificate and the certificate validity information are used to verify, after a second node in the blockchain receives a first communication request sent by a first node, whether a digital certificate of the first node that is included in the first communication request is valid.

According to a seventh aspect, an implementation of the present application provides an electronic device. The electronic device is applied to a blockchain and includes: a processor; and a memory, configured to store a computer executable instruction, where the executable instruction is executed by the processor to perform the following operations: receiving a digital certificate of a node and validity status information of the digital certificate that are sent by a CA center; determining, based on the validity status information of the digital certificate, certificate validity information used to reflect the validity status information of the digital certificate; and storing the digital certificate and the certificate validity information in a blockchain, where the digital certificate and the certificate validity information are used to verify, after a second node in the blockchain receives a first communication request sent by a first node, whether a digital certificate of the first node that is included in the first communication request is valid.

According to an eighth aspect, an implementation of the present application provides an apparatus for blockchain-based digital certificate management. The apparatus is applied to a CA center and includes: a sending module, configured to send a digital certificate of a node in a blockchain and validity status information of the digital certificate to the blockchain, so that the blockchain determines, based on the validity status information of the digital certificate, certificate validity information used to reflect the validity status information of the digital certificate, and stores the digital certificate and the certificate validity information, so as to verify, after a second node in the blockchain receives a first communication request sent by a first node, whether a digital certificate of the first node that is included in the first communication request is valid.

Preferably, the apparatus for blockchain-based digital certificate management provided in the eighth aspect further includes: an application request receiving module, configured to receive a certificate application request sent by the node in the blockchain, where the certificate application request includes application information of the first node and is used to apply to the CA center for the digital certificate of the first node; a receiving and reviewing module, configured to receive and review the application information of the first node; and an issuing and sending module, configured to: when the application information of the first node passes the review, issue the digital certificate to the first node, where validity status information of the digital certificate is valid.

According to a ninth aspect, an implementation of the present application provides an electronic device. The electronic device is applied to a CA center and includes: a processor; and a memory, configured to store a computer executable instruction, where the executable instruction is executed by the processor to perform the following operations: sending a digital certificate of a node in a blockchain and validity status information of the digital certificate to the blockchain, so that the blockchain determines, based on the validity status information of the digital certificate, certificate validity information used to reflect the validity status information of the digital certificate, and stores the digital certificate and the certificate validity information, so as to verify, after a second node in the blockchain receives a first communication request sent by a first node, whether a digital certificate of the first node that is included in the first communication request is valid.

Preferably, in the electronic device provided in the ninth aspect, the executable instruction is executed by the processor to further perform the following operations: receiving a certificate application request sent by the node in the blockchain, where the certificate application request includes application information of the first node and is used to apply to the CA center for the digital certificate of the first node; receiving and reviewing the application information of the first node; and when the application information of the first node passes the review, issuing the digital certificate to the first node, where validity status information of the digital certificate is valid.

The implementations of the present application can use at least one of the previous technical solutions to achieve the following beneficial effects.

By using the technical solutions of the present application, the digital certificate required when the first node sends the communication request is stored in the blockchain, and the certificate validity information that is used as a basis when the second node verifies whether the digital certificate of the first node is valid is also stored in the blockchain. Because of advantages such as decentralization, openness and transparency, and tamper-resistance of the blockchain, even if the CA center is hacked, the hacker cannot tamper with the digital certificate and the certificate validity information that are stored in the blockchain, and therefore, cannot use the invalid digital certificate to join in the blockchain. The validity information of a certificate is stored in the blockchain, and can correctly reflect the validity status information of a node certificate. Therefore, by using the validity information of a certificate to verify whether the certificate of the node is valid, an unauthorized node can be prevented from joining in the blockchain, so as to ensure the security of the communication between blockchain nodes and further improve the security of the blockchain network.

BRIEF DESCRIPTION OF DRAWINGS

The accompanying drawings described here are intended to provide a further understanding of the present application, and constitute a part of the present application. The illustrative implementations of the present application and descriptions of the implementations are intended to describe the present application, and do not constitute limitations on the present application. In the accompanying drawings.

DESCRIPTION OF IMPLEMENTATIONS

Figure 1:
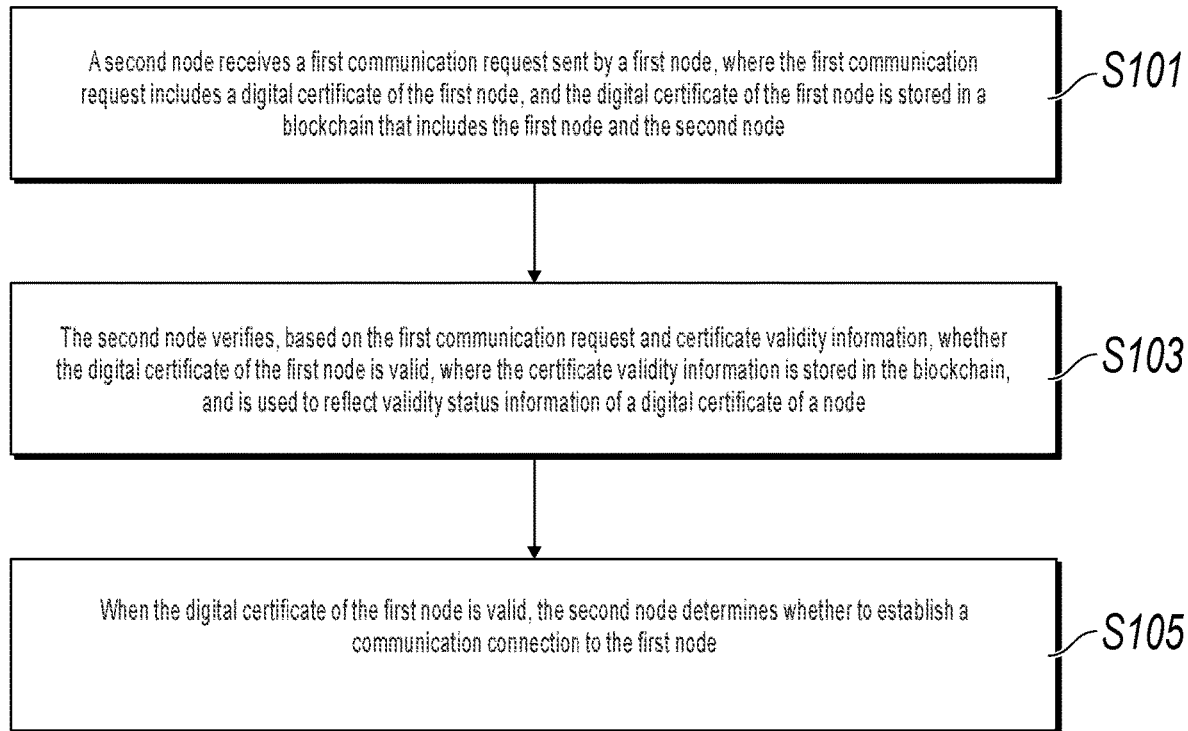
FIG. 1 is a schematic flowchart illustrating a method for communication between blockchain nodes, according to an implementation of the present application.

To make the objectives, technical solutions, and advantages of the present application clearer, the following describes the technical solutions of the present application with reference to specific implementations of the present application and corresponding accompanying drawings. Apparently, the described implementations are merely some rather than all of the implementations of the present application. Other implementations obtained by a person of ordinary skill in the art based on the implementations of the present application without creative efforts shall fall within the protection scope of the present application.

Currently, blockchain systems mainly fall into three types: a public blockchain, a private blockchain, and a consortium blockchain. These three types of blockchains mainly differ in open objects. The public blockchain is open to everyone. Anyone can read and send a transaction, and the transaction can be effectively confirmed. Anyone can join in a consensus process. Typical applications include the bitcoin, Ethereum, hyperledger, etc. The private blockchain is open to a single individual, entity, or organization. The write permission is controlled by only one organization. The read permission can be open to the outside or can be randomly restricted. Typical applications include hyperledger projects, etc. of the Linux Foundation, R3CEVCorda platform, and Gem Health network. The consortium blockchain serves between the public blockchain and the private blockchain, is open to a particular individual, entity, or organization, and other individuals, entities, or organizations are restricted.

In the blockchain, especially in the consortium blockchain for a plurality of particular organizations, to improve communication security, a certificate authority center (CA center) is usually designed. The CA center, also referred to as a CA organization, serves as a trusted third party in an e-commerce transaction and is responsible for validity verification of a public key in a public key system. The CA center issues a digital certificate to each node user that uses the public key. The function of the digital certificate is to prove that a user listed in the certificate has validly possessed the public key listed in the certificate. In order to prevent an attacker from forging or altering certificates, the CA center digitally signs each digital certificate.

In the blockchain application, the CA center of the blockchain can implement inter-authentication among nodes in the blockchain and improve security of communication between blockchain nodes. The blockchain maintains one CA center and issues a digital certificate (also referred to as a node certificate) of a node to each node that joins in blockchain communication, so that only nodes that hold valid certificates can communicate with each other.

In some implementations, the issued node certificate and information related to certificate validity (reflecting whether a node that corresponds to the certificate is allowed to join in the blockchain) are both stored in a server of the CA center, and can be invoked and queried by the nodes in the blockchain during the communication to complete the verification of the communication process. There is a relatively big security risk in the method because secure communication between blockchain nodes depends on verification of node certificate validity when the communication connection is established. In the previous implementation solution, the node certificate that is issued by the CA center and the information related to the certificate validity are both stored in the server of the CA center. Once the CA center is hacked, the hacker can arbitrarily modify the information related to the certificate validity. For example, the hacker can alter a certificate revocation list and restore a revoked certificate to normal. The hacker can use these previously revoked certificates to join in the blockchain without being authorized, thereby threatening the security of the blockchain.

In addition, in the previous implementation solution, to verify the node certificate validity, the blockchain needs to remotely invoke the information that is stored in the CA center and that is related to the certificate validity. Consequently, a response speed can be low, information is intercepted during transmission, a risk related to an information invocation speed and security can occur, and therefore, verification of the node certificate validity is affected.

Therefore, the implementations of the present application provide a method, an apparatus, and an electronic device for communication between blockchain nodes, and a method, an apparatus, and an electronic device for blockchain-based digital certificate management, so as to improve security of the communication between blockchain nodes and further improve security of a blockchain network.

The technical solutions provided in the implementations of the present application are described in detail below with reference to the accompanying drawings.

As shown in FIG. 1, an implementation of the present application provides a method for communication between blockchain nodes. The method can specifically include the following steps:

S101. A second node receives a first communication request sent by a first node, where the first communication request includes a digital certificate of the first node, and the digital certificate of the first node is stored in a blockchain that includes the first node and the second node.

S103. The second node verifies, based on the first communication request and certificate validity information, whether the digital certificate of the first node is valid, where the certificate validity information is stored in the blockchain, and is used to reflect validity status information of a digital certificate of a node.

S105. When the digital certificate of the first node is valid, the second node establishes a communication connection to the first node.

It can be understood that the first node and the second node in the previous implementation can be any two different nodes in the blockchain. When the first node (which can be any node in the blockchain) in the blockchain expects to communicate with the second node (which can be any node other than the first node in the blockchain), the first node can add the digital certificate of the first node to a communication request, and send the communication request to the second node, so as to prove, to the second node, a valid identity of the first node that is authenticated by the CA center. An applicable scenario of this interaction process can be: the first node expects to communicate with the second node, and before establishing the communication connection, the second node first verifies whether the first node that requests communication is an authorized node, so as to determine whether to agree to the communication request of the first node. In this scenario, the first node corresponding to the second node sends the previous first communication request to the second node, and sends the digital certificate of the first node to the second node for verification; and the first node then waits to receive a response or feedback from the second node. For example, the response or the feedback can be a digital certificate verification result: validity or invalidity, or can be information indicating determining to establish the communication connection after the second node verifies that the digital certificate of the first node is valid, or can be a digital certificate of the second node that is sent by the second node to the first node for verification by the first node.

It can be further understood that, when the second node (which can be any node in the blockchain) in the blockchain expects to communicate with the first node (which can be any node other than the second node in the blockchain), before step S101, pre-steps can be included: the second node sends a handshake request to the first node, so as to request to establish a session with the first node and request the first node to send the digital certificate of the first node for verification; in response, the first node can then send the previous first communication request to the second node, and sends the digital certificate of the first node to the second node for verification. An applicable scenario of this interaction process can be: the second node expects to communicate with the first node, and when establishing the communication connection, the second node expects to first verify whether the first node in the blockchain is an authorized node, so as to determine whether to establish the communication connection to the first node. Similar to the previous scenario, the second node can feed back information that includes various types of content and that is in various forms to the first node, and details are not described here.

It can be understood that, to ensure the communication security, the second node that receives the communication request needs to verify whether the first node that establishes the communication connection to the second node has a valid identity, and specifically, the second node can verify whether the digital certificate of the first node that is included in the communication request sent by the first node is a valid digital certificate. In specific implementations, the present application uses certificate validity information stored in the blockchain to verify the digital certificate of the first node.

In the implementations of the present application, the digital certificate of each node in the blockchain and the previous certificate validity information are stored in the blockchain that contains the node, and the digital certificate can be stored in the blockchain by writing the digital certificate into the blockchain. Therefore, in the implementations of the present application, characteristics of the blockchain, such as decentralization and tamper-resistance, can be used to prevent the hacker from tampering with the digital certificate and the certificate validity information that reflects the validity status information of the digital certificate, so as to ensure that a certificate validity verification result is correct and accurate, and ensure security and stability of the blockchain network. In addition, in this implementation of the present application, when verifying validity of the digital certificate, the second node can directly read the certificate validity information that is locally stored in the node, without a need to remotely invoke the certificate validity information stored in the CA center, and consequently, the speed and security of validity verification are improved. In addition, by locally invoking information such as certificate validity information, single point dependency of the blockchain on the CA center can be eliminated, and reliability of the blockchain network is further improved.

In this implementation of the present application, the validity status information of the digital certificate can fall into two types: One type of validity status information indicating that a certificate is valid, and another type of validity status information indicating that a certificate is invalid. The invalid digital certificate is generally revoked by the CA center.

Before step S103 is performed, to verify the validity of the digital certificate by invoking the certificate validity information from the blockchain that includes the first node and the second node, records of the digital certificate and the validity status information of the digital certificate that are received by the blockchain can be collated in advance to form the certificate validity information for query by the second node. More specifically, the certificate validity information can be embodied as a basis for receiving the valid digital certificates assembled from a valid certificate list, and also reflects the basis of receiving invalid digital certificates assembled from a revoked certificate list.

Further, if an invalid digital certificate that is revoked is recorded in the previous certificate validity information, for example, the previous certificate validity information is embodied as a revoked certificate list that is formed based on the record of the invalid digital certificate that is received, that the second node verifies, based on the first communication request and the certificate validity information, whether the digital certificate of the first node is valid in the previous step S103 can specifically include: determining, by the second node, the digital certificate of the first node based on the first communication request; verifying, by the second node based on the certificate validity information stored in the blockchain, whether the digital certificate of the first node is recorded in the previous certificate validity information; and if the digital certificate of the first node is recorded in the certificate validity information, which indicates that the digital certificate of the first node is revoked, verifying that the digital certificate of the first node is invalid.

Similarly, if the previous certificate validity information records a valid digital certificate, for example, the previous certificate validity information is embodied as a valid certificate list that is formed based on the record of the valid digital certificate that is received, that the second node verifies, based on the first communication request and the certificate validity information, whether the digital certificate of the first node is valid in the previous step S103 can specifically include: determining, by the second node, the digital certificate of the first node based on the first communication request; verifying, by the second node based on the certificate validity information stored in the blockchain, whether the digital certificate of the first node is recorded in the certificate validity information; and if the digital certificate of the first node is recorded in the certificate validity information, which indicates that the digital certificate of the first node is authenticated, verifying that the digital certificate of the first node is valid.

In specific implementations, the second node can parse the first communication request sent by the first node to determine the digital certificate of the first node.

The digital certificate of the node is issued by the CA center (which can be the previous CA center), and is used to verify an entity identity of each node that joins in blockchain communication. In Internet communication, the digital certificate can be embodied as a string of numbers indicating identity information of parties in communication, and can include content such as a certificate version number, certificate holder information (for example, the certificate holder information can be embodied as identity information of a node that corresponds to the certificate), CA center information, a certificate validity period, a certificate serial number, and a CA center signature.

In the previous implementation, a process in which the second node verifies the digital certificate of the first node is described. When the digital certificate of the first node is valid, the second node can further determine whether to establish the communication connection to the first node. More specifically, it can be determined based on the communications protocol between the first node and the second node where the blockchain is located. The following provides detailed description by using an example.

For example, if the communication's protocol stipulates that the only unidirectional verification needs to be performed for inter-node communication, when the second node verifies that the digital certificate of the first node is valid, the second node can directly establish the communication connection to the first node.

For example, if the communications protocol stipulates that bidirectional verification needs to be performed for the inter-node communication, in this implementation of the present application, in addition to verification of certificate validity of the first node, the second node also needs to send the digital certificate of the second node to the first node, so that the first node verifies the validity of the digital certificate of the second node. Specifically, the method in this implementation of the present application can further include: sending, by the second node, a second communication request to the first node, where the second communication request includes the digital certificate of the second node. The second node sends the digital certificate of the second node to the first node, so that the first node verifies whether the digital certificate of the second node is valid based on the digital certificate in the second communication request and the certificate validity information locally stored in the first node. Further, after the first node verifies that the digital certificate of the second node is valid and the second node verifies that the digital certificate of the first node is valid, the communication connection is established between the second node and the first node. For this point-to-point application scenario of communication between blockchain nodes, a bidirectional verification method is preferred.

In specific implementations, a specific node acts as a communication request initiator, and another node acts as a communication request recipient. An interaction sequence of both nodes can be determined by a communications protocol of both nodes, provided that a digital certificate of a peer node can be eventually verified. The solution provided in this implementation of the present application imposes no limitation on specific steps and an execution order of the steps.

In specific implementations, preferably, the communication connection is established between the nodes in the blockchain by using the SSL protocol or the TLS protocol. Accordingly, the first communication request received by the second node is sent by the first node based on the SSL protocol or the TLS protocol, and consequently, an encrypted communication channel is established between the nodes. The network connection can be encrypted at a transmission layer by using the SSL protocol or the TLS protocol, so as to ensure data transmission security. By using a data encryption technology, it can be further ensured that data is not intercepted or eavesdropped on in a network transmission process.

Figure 2:
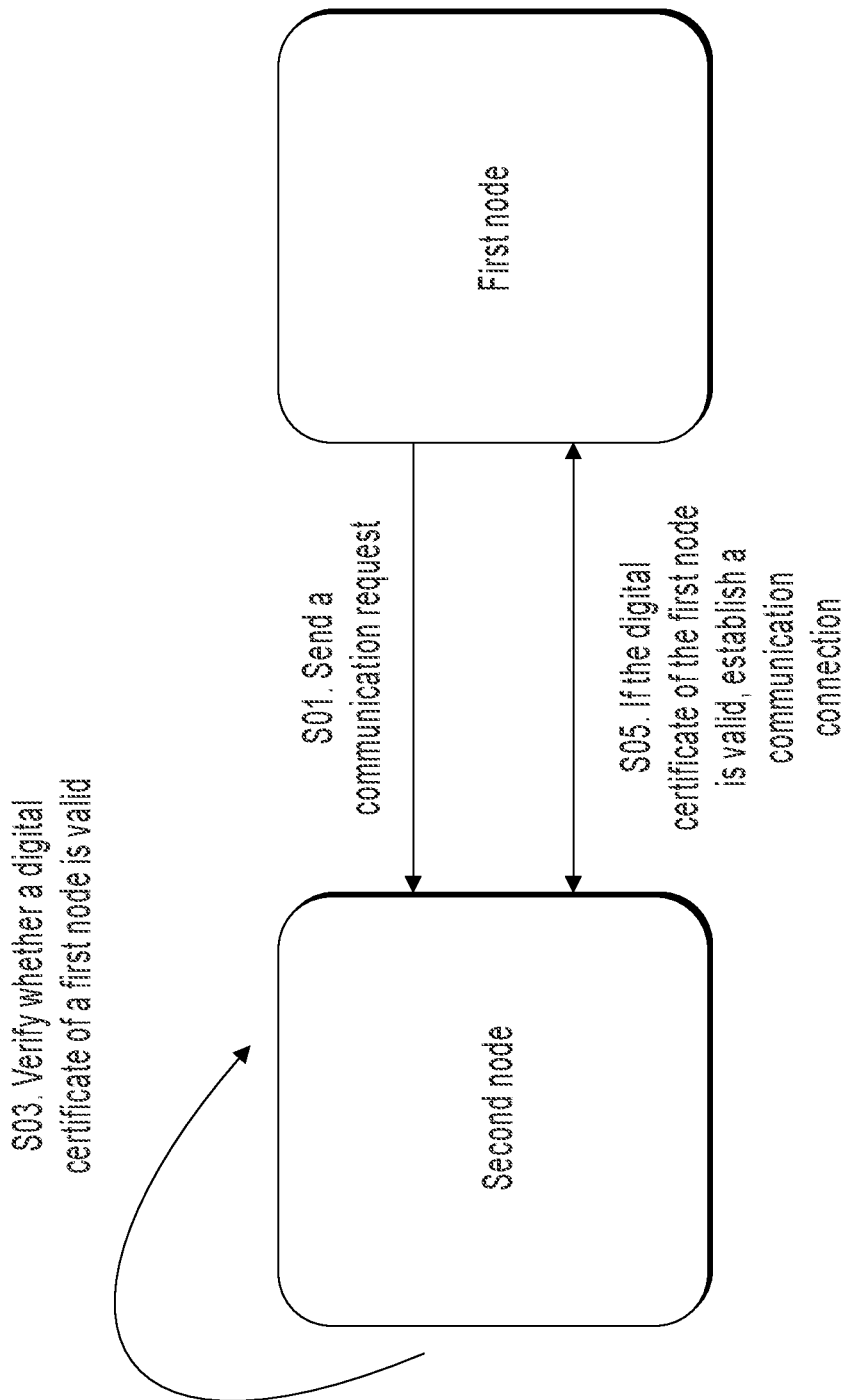
FIG. 2 is a schematic diagram illustrating a simplified scenario of a method for communication between blockchain nodes, according to an implementation of the present application.

The previous implementation describes in detail a plurality of aspects of the method for communication between blockchain nodes in the present application. FIG. 2 briefly illustrates an information exchange process of the method. Here, only unidirectional authentication is used as an example.

S01. The first node sends a communication request to the second node.

S02. The second node locally invokes the certificate validity information and verifies whether the digital certificate of the first node is valid.

S03. If the digital certificate of the first node is valid, the second node establishes the communication connection to the first node.

A core idea of this implementation of the present application is as follows: A digital certificate of the blockchain is stored in the blockchain, and the certificate validity information used to reflect the validity status information of the digital certificate of the node is also stored in the blockchain, so that the digital certificate is verified by using such tamper-resistant information, so as to ensure correctness and accuracy of the verification result, and ensure communication security of the nodes in the blockchain.

The following describes in detail a specific implementation of blockchain-based digital certificate management by the blockchain system and the CA center.

Figure 3:
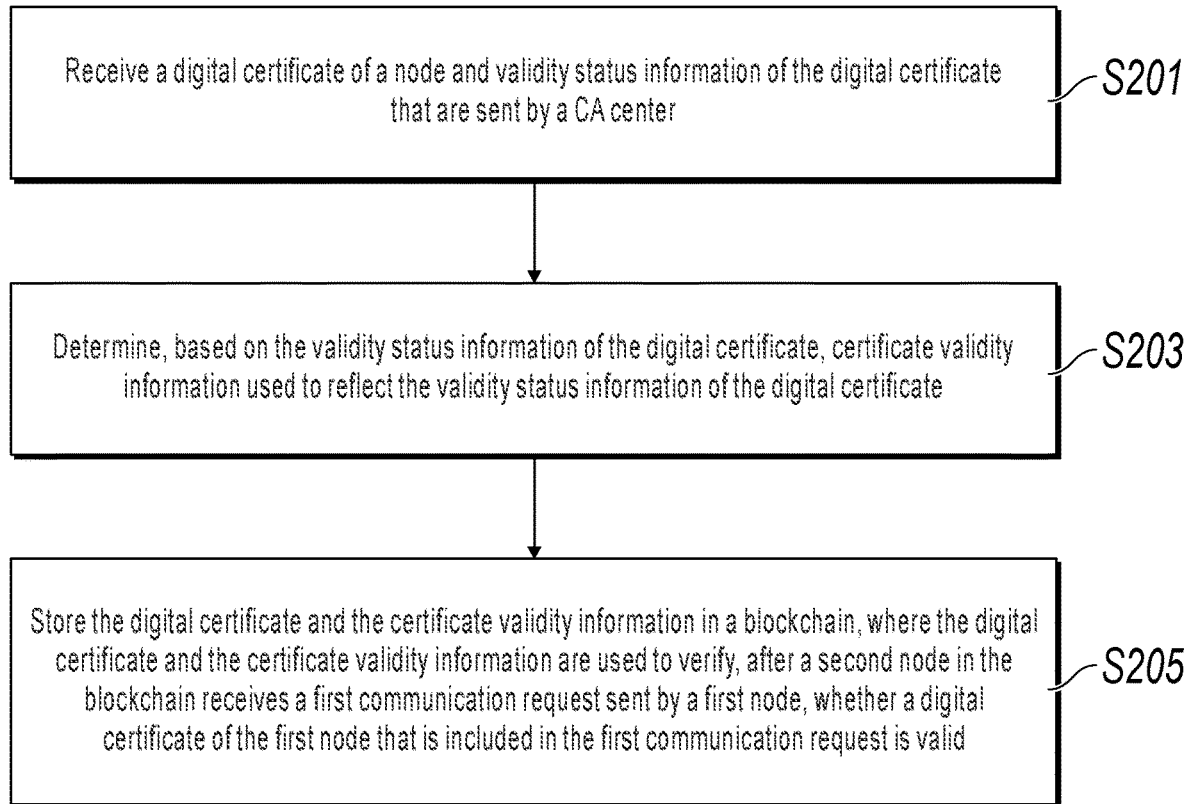
FIG. 3 is a schematic flowchart illustrating a method for blockchain-based digital certificate management, according to an implementation of the present application.

As shown in FIG. 3, an implementation of the present application provides a method for blockchain-based digital certificate management. The method is applied to a blockchain system and can specifically include the following steps:

S201. Receive a digital certificate of a node and validity status information of the digital certificate that are sent by a CA center.

S203. Determine, based on the validity status information of the digital certificate, certificate validity information used to reflect the validity status information of the digital certificate.

S205. Store the digital certificate and the certificate validity information in a blockchain, where the digital certificate and the certificate validity information are used to verify, after a second node in the blockchain receives a first communication request sent by a first node, whether a digital certificate of the first node that is included in the first communication request is valid.

Specifically, when step S203 of determining, based on the validity status information of the digital certificate, certificate validity information used to reflect the validity status information of the digital certificate is performed, as described in the previous implementation, records of the digital certificate and the validity status information of the digital certificate that are received by the blockchain can be collated, so as to determine the certificate validity information that is to be queried by the second node. More specifically, the certificate validity information not only can be embodied as a valid certificate list that is formed based on a record of a valid digital certificate that is received, but also can be embodied as a revoked certificate list that is formed based on a record of an invalid digital certificate that is received.

In specific implementations, the blockchain can store a new digital certificate or new validity status information of the digital certificate based on the digital certificate of the node and the validity status information of the digital certificate that are received in step S201, so that the certificate validity information stored in the blockchain can also be updated accordingly, so as to ensure accuracy of the verification result.

In a method that corresponds to the previous method for blockchain-based digital certificate management, the CA center also sends the digital certificate of the node in the blockchain and the validity status information of the digital certificate to the blockchain, so that the blockchain determines, based on the validity status information of the digital certificate, the certificate validity information used to reflect the validity status information of the digital certificate, and stores the digital certificate and the certificate validity information, so as to verify, after the second node in the blockchain receives the first communication request sent by the first node, whether the digital certificate of the first node that is included in the first communication request is valid.

For the blockchain, in addition to reception of the digital certificate and the validity status information of the digital certificate that are sent by the CA center, a node requesting to join in the blockchain can further send a certificate application request to the CA center. The certificate application request includes application information of the first node and is used to apply to the CA center for the digital certificate of the first node.

Accordingly, the CA center can receive the certificate application request sent by the node in the blockchain. The certificate application request includes the application information of the first node and is used to apply to the CA center for the digital certificate of the first node. The CA center further receives and reviews the application information of the first node. When the application information of the first node passes the review, the CA center issues the digital certificate to the first node, and validity status information of the digital certificate is "valid".

Figure 4:
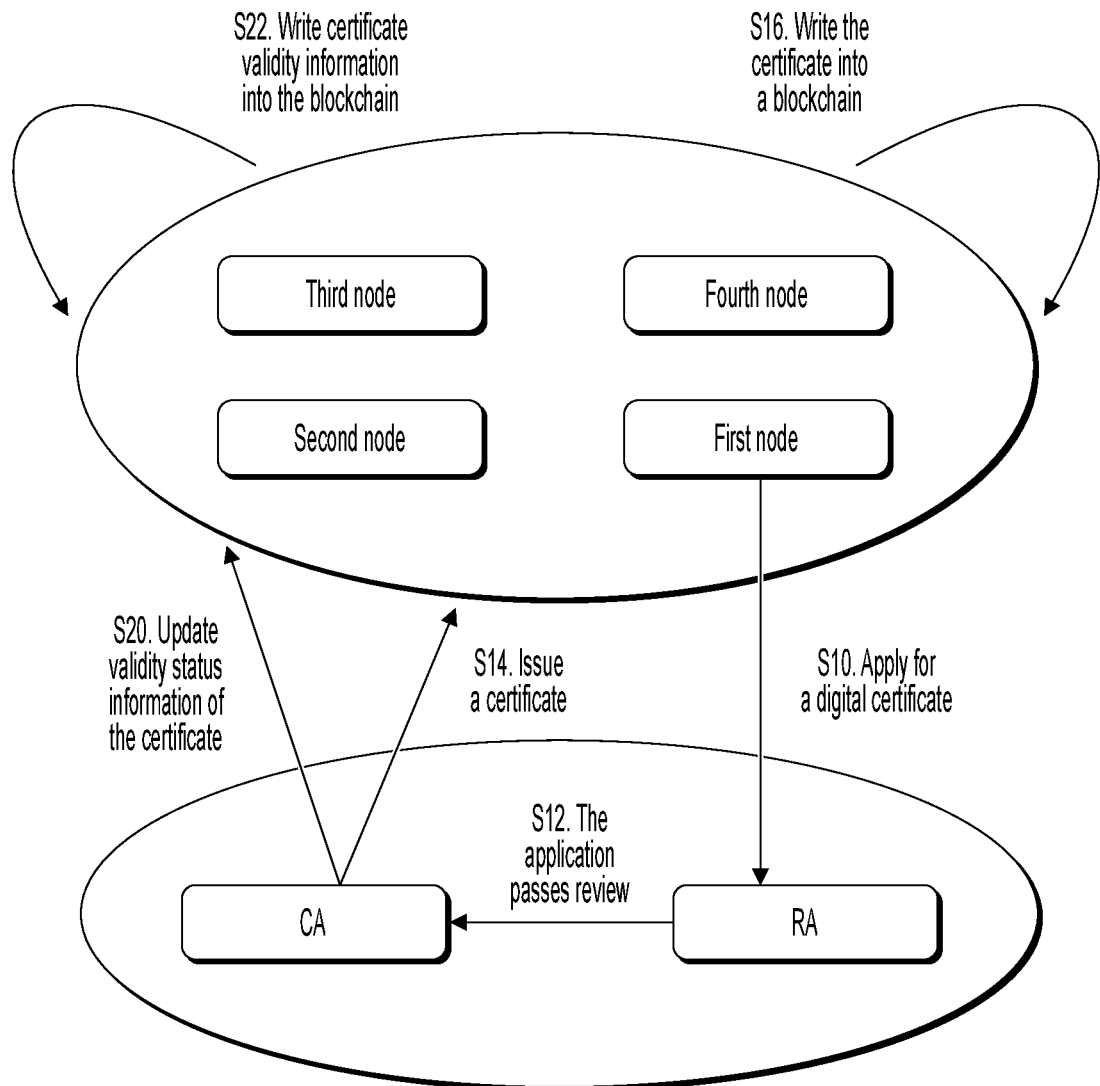
FIG. 4 is a schematic diagram illustrating a scenario in which a blockchain and a CA center interact to manage a digital certificate, according to an implementation of the present application.

FIG. 4 briefly illustrates an example process of interaction between a blockchain system and a CA center. A stage in which a node in the blockchain applies to the CA center for the digital certificate can specifically include the following steps:

S10. The blockchain system (for example, a first node) sends, to the CA center (including an RA institution that accepts certificate applications and a CA institution that issues certificates), an application to apply for the digital certificate.

S12. The RA (accepting institution) receives and reviews the application, and after the application passes the review, the RA forwards the application to the CA institution (certification institution) for processing.

S14. The CA institution issues the digital certificate, and the CA institution sends the issued digital certificate to the blockchain system.

S16. After receiving the issued digital certificate, the blockchain system writes the certificate into the blockchain to store the certificate into all nodes (such as the first node, the second node, the third node, and the fourth node that are shown in FIG. 4) in the blockchain system.

Further, when the digital certificate issued by the CA center is revoked, the validity status information of the digital certificate is changed from "valid" to "invalid" (or "revoked"), and the CA center performs step S20 to send, to the blockchain system, an instruction for updating the validity status information of the certificate. In specific implementations, the CA center can send both the digital certificate and validity status information of the digital certificate to the blockchain by using a similar method for issuing a new digital certificate. The only difference is that the validity status information of the digital certificate is "invalid" or "revoked" in this situation. After receiving the previous information, the blockchain performs step S22, updates the certificate validity information based on the new validity status information of the certificate, and writes the certificate validity information into the blockchain, so as to provide accurate certificate validity information when the digital certificate of the node is verified.

Figure 5:
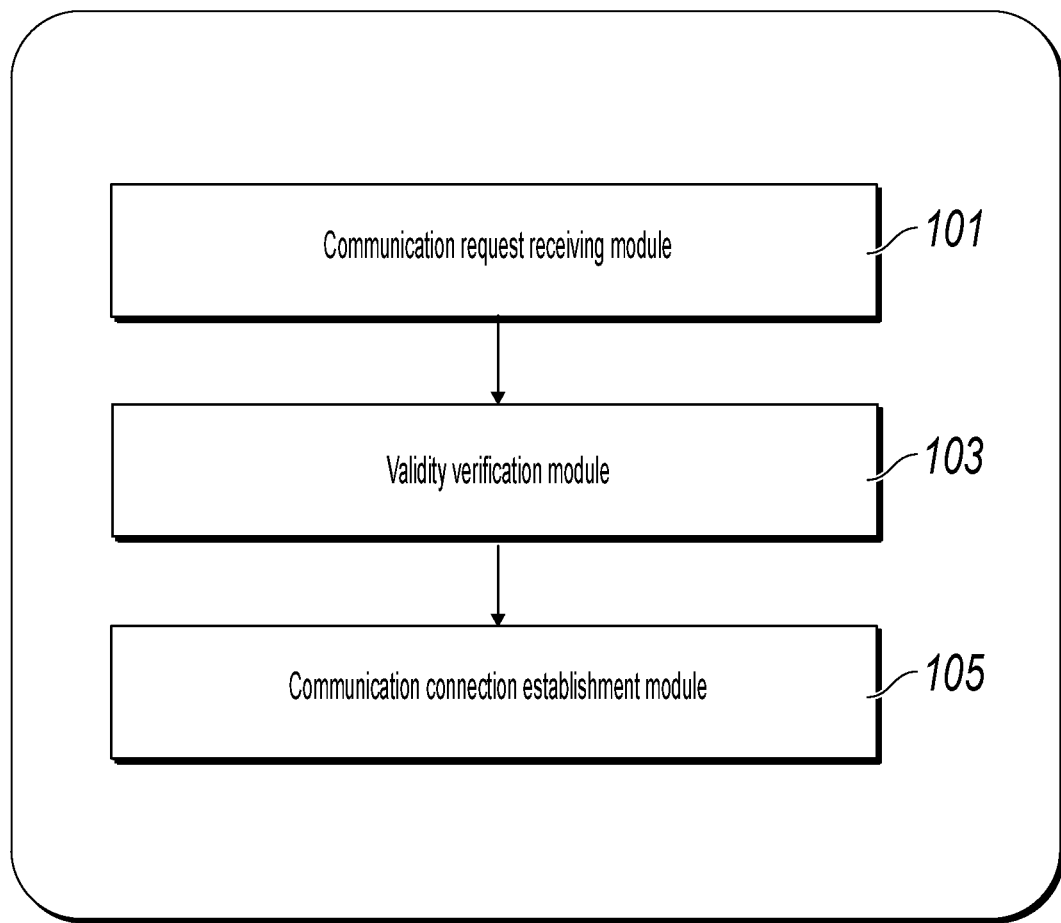
FIG. 5 is a schematic structural diagram illustrating an apparatus for communication between blockchain nodes that is applied to a blockchain, according to an implementation of the present application.

An implementation of the present application further provides an apparatus for communication between blockchain nodes. As shown in FIG. 5, the apparatus is applied to a second node in a blockchain and includes: a communication request receiving module 101, configured to receive a first communication request sent by a first node, where the first communication request includes a digital certificate of the first node, and the digital certificate of the first node is stored in a blockchain that includes the first node and the second node; a validity verification module 103, configured to verify, based on the first communication request and certificate validity information, whether the digital certificate of the first node is valid, where the certificate validity information is stored in the blockchain, and is used to reflect validity status information of a digital certificate of a node; and a communication connection establishment module 105, configured to: when the digital certificate of the first node is valid, determine whether to establish a communication connection to the first node.

Figure 6:
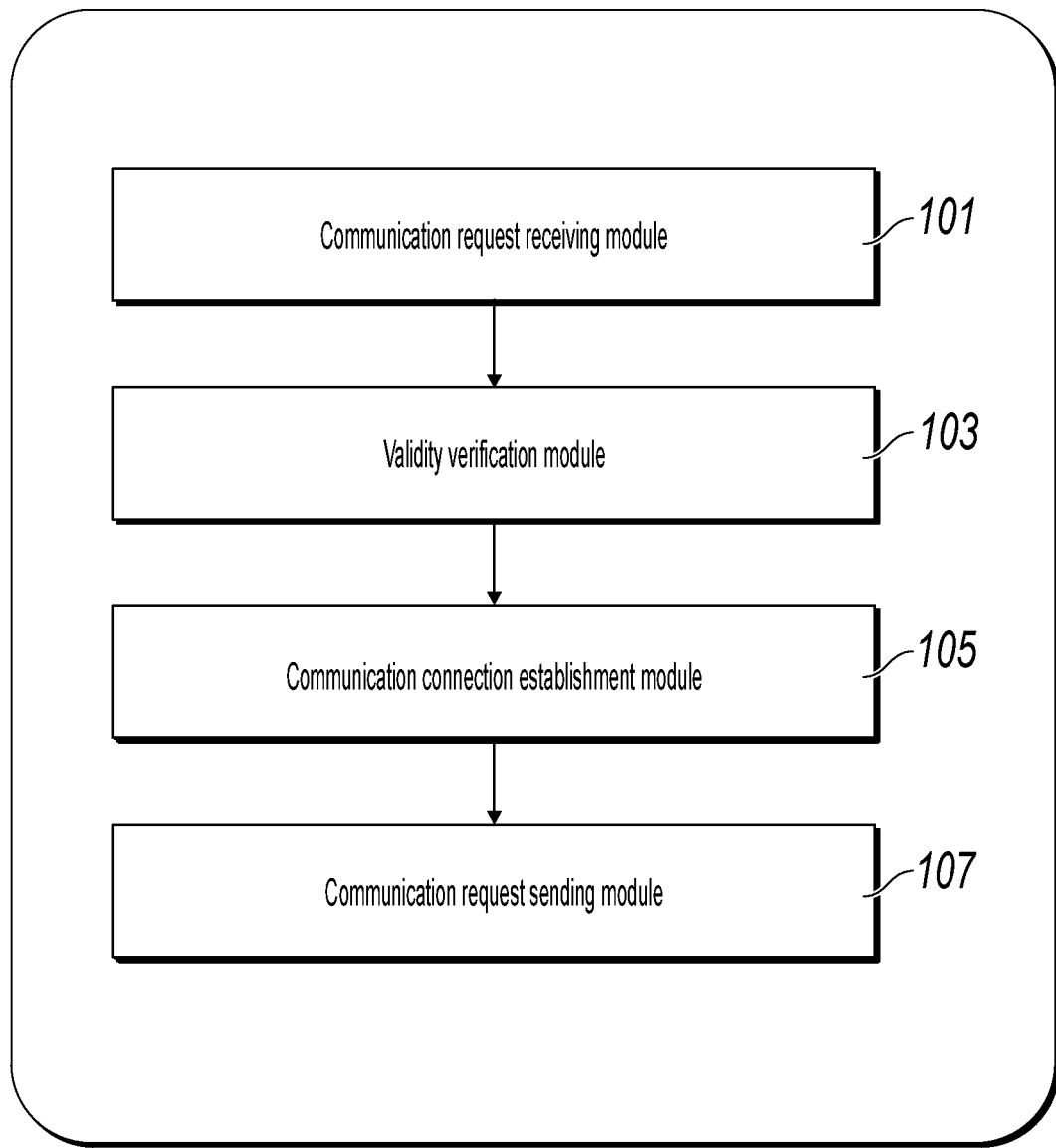
FIG. 6 is a schematic structural diagram illustrating another apparatus for communication between blockchain nodes that is applied to a blockchain, according to an implementation of the present application.

As shown in FIG. 6, the previous apparatus can further include: a communication request sending module 107, configured to send a second communication request to the first node, where the second communication request includes a digital certificate of the second node, so that the first node verifies, based on the second communication request and the certificate validity information, whether the digital certificate of the second node is valid; and the communication connection establishment module 105 can be specifically configured to: when the digital certificate of the first node is valid and the first node verifies that the digital certificate of the second node is valid, establish the communication connection to the first node.

Figure 7:
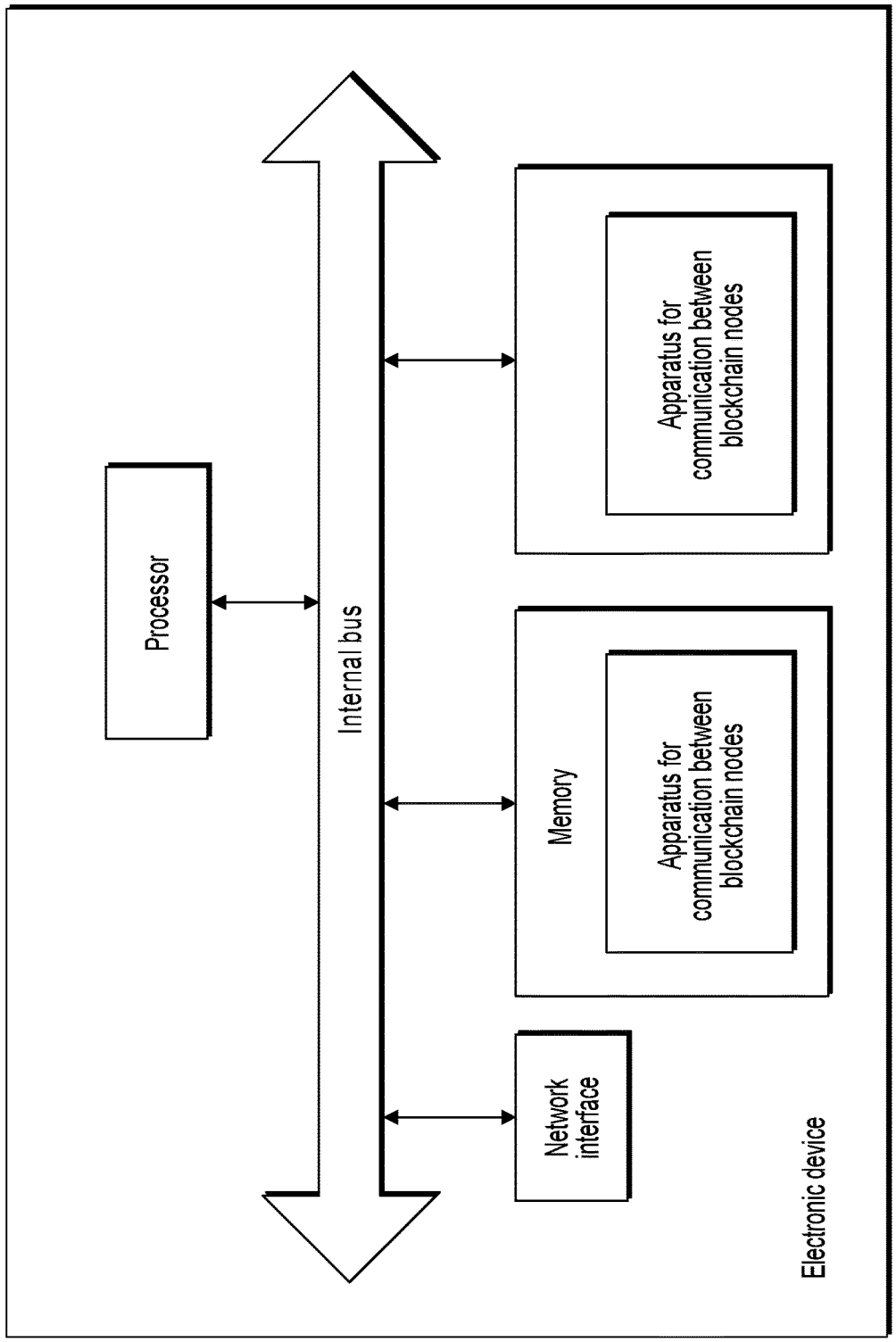
FIG. 7 is a schematic structural diagram illustrating an electronic device that is applied to a node in a blockchain, according to an implementation of the present application.

FIG. 7 is a schematic structural diagram of an electronic device according to an implementation of the present application. Referring to FIG. 7, the electronic device includes a processor, and optionally further includes an internal bus, a network interface, and a storage in terms of hardware. The storage can include a memory, for example, a high-speed random access memory (RAM), or can further include a non-volatile memory, for example, at least one magnetic disk memory. Certainly, the electronic device can further include hardware required by another service.

The processor, the network interface, and the storage can be interconnected by using the internal bus. The internal bus can be an industry standard architecture (ISA) bus, a peripheral component interconnect (PCI) bus, an extended industry standard architecture (EISA) bus, etc. The bus can be classified into an address bus, a data bus, a control bus, etc. For ease of representation, only a double-headed arrow is used in FIG. 7, but it does not indicate that there is only one bus or only one type of bus.

The storage is configured to store a program. Specifically, the program can include program code, and the program code includes a computer operation instruction. The storage can include a memory and a non-volatile memory, and provide an instruction and data for the processor.

The processor reads the corresponding computer program from the non-volatile memory into the memory and then runs the corresponding computer program, so as to form the apparatus for communication between blockchain nodes in terms of logic. The processor executes the program stored in the storage to perform the following operations: receiving a first communication request sent by a first node, where the first communication request includes a digital certificate of the first node, and the digital certificate of the first node is stored in a blockchain that includes the first node and the second node; verifying, based on the first communication request and certificate validity information, whether the digital certificate of the first node is valid, where the certificate validity information is stored in the blockchain, and is used to reflect validity status information of a digital certificate of a node; and when the digital certificate of the first node is valid, determining whether to establish a communication connection to the first node.

The previous method that is performed by the apparatus for communication between blockchain nodes and that is disclosed in the implementation shown in FIG. 1 of the present application can be applied to the processor or can be implemented by the processor. The processor can be an integrated circuit chip, and have a signal processing capability. In an implementation process, steps of the previous method can be completed by using an integrated logic circuit of hardware in the processor or an instruction in a form of software. The previous processor can be a general purpose processor, and include a central processing unit (CPU), a network processor (NP), etc., or can be a digital signal processor (DSP), an application-specific integrated circuit (ASIC), a field-programmable gate array (FPGA), or another programmable logic device (PLD), a discrete gate or a transistor logic device, or a discrete hardware component. The previous processor can implement or perform methods, steps, and logic block diagrams disclosed in the implementations of the present application. The general purpose processor can be a microprocessor, or the processor can be any conventional processor, etc. The steps of the method disclosed with reference to the implementations of the present application can be directly performed and completed by a hardware decoding processor, or can be performed and completed by using a combination of a hardware module and a software module in a decoding processor. The software module can be located in a mature storage medium in the art, such as a RAM, a flash memory, a read-only memory (ROM), a programmable read-only memory (PROM), an electrically erasable programmable read-only memory (EEPROM), or a register. The storage medium is located in the storage, and the processor reads information from the storage and completes the steps of the previous method by using the hardware of the processor.

The electronic device can further perform the method in FIG. 1 that is performed by the apparatus for communication between blockchain nodes, and implement functions of the apparatus for communication between blockchain nodes in the implementation shown in FIG. 1. Details are not described in this implementation of the present application.

An implementation of the present application further provides a computer-readable storage medium. The computer-readable storage medium stores one or more programs, the one or more programs include instructions. The instructions are executed by an electronic device including a plurality of application programs to perform the method that is performed by the apparatus for communication between blockchain nodes in the implementation shown in FIG. 1, including: receiving a first communication request sent by a first node, where the first communication request includes a digital certificate of the first node, and the digital certificate of the first node is stored in a blockchain that includes the first node and the second node; verifying, based on the first communication request and certificate validity information, whether the digital certificate of the first node is valid, where the certificate validity information is stored in the blockchain, and is used to reflect validity status information of a digital certificate of a node; and when the digital certificate of the first node is valid, determining whether to establish a communication connection to the first node.

Still further, in the electronic device shown in FIG. 7, the executable instruction is executed by the processor to further perform the following operations: sending a second communication request to the first node, where the second communication request includes a digital certificate of the second node, so that the first node verifies, based on the second communication request and the certificate validity information, whether the digital certificate of the second node is valid; and when the digital certificate of the first node is valid and the first node verifies that the digital certificate of the second node is valid, establishing, by the second node, the communication connection to the first node.

Figure 8:
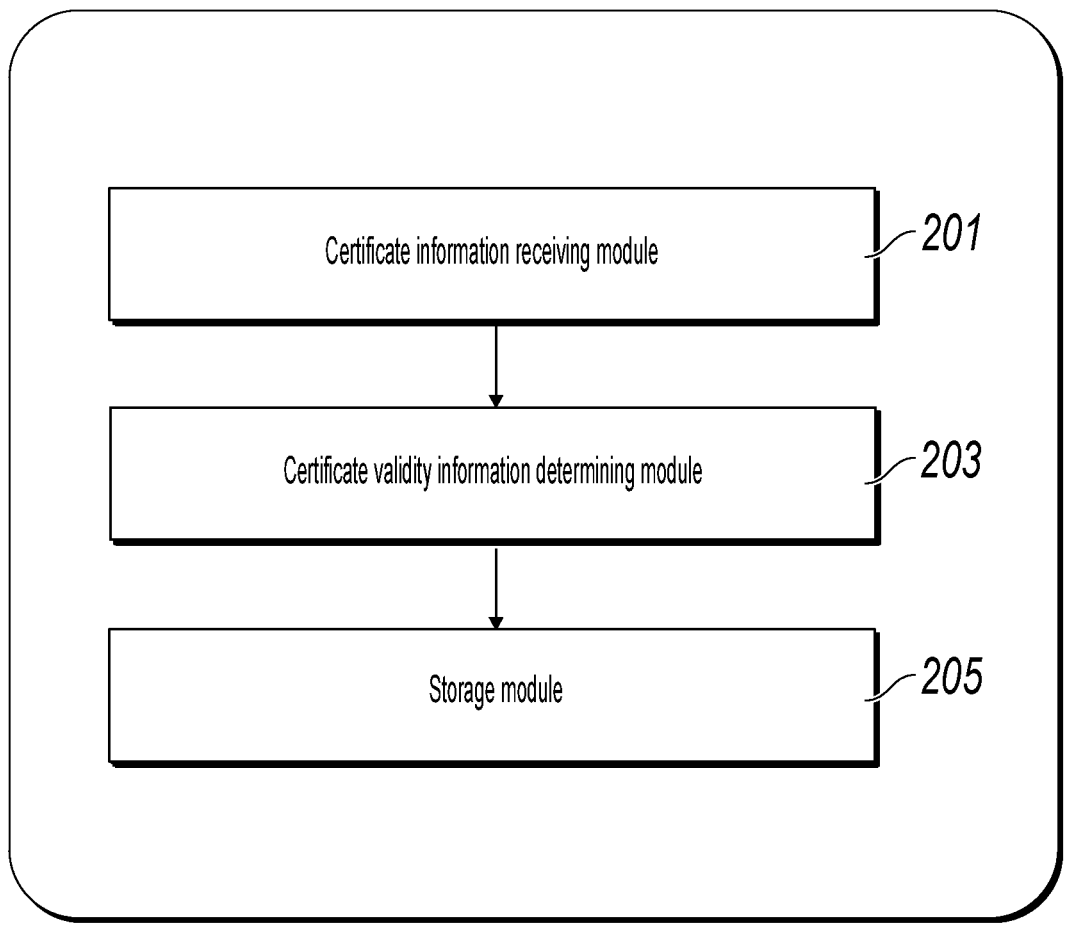
FIG. 8 is a schematic structural diagram illustrating an apparatus for digital certificate management that is applied to a blockchain, according to an implementation of the present application.

An implementation of the present application further provides an apparatus for blockchain-based digital certificate management. As shown in FIG. 8, the apparatus is applied to a blockchain and includes: a certificate information receiving module 201, configured to receive a digital certificate of a node and validity status information of the digital certificate that are sent by a CA center; a certificate validity information determining module 203, configured to determine, based on the validity status information of the digital certificate, certificate validity information used to reflect validity status information of the digital certificate; and a storage module 205, configured to store the digital certificate and the certificate validity information in the blockchain, where the digital certificate and the certificate validity information are used to verify, after a second node in the blockchain receives a first communication request sent by a first node, whether a digital certificate of the first node that is included in the first communication request is valid.

Figure 9:
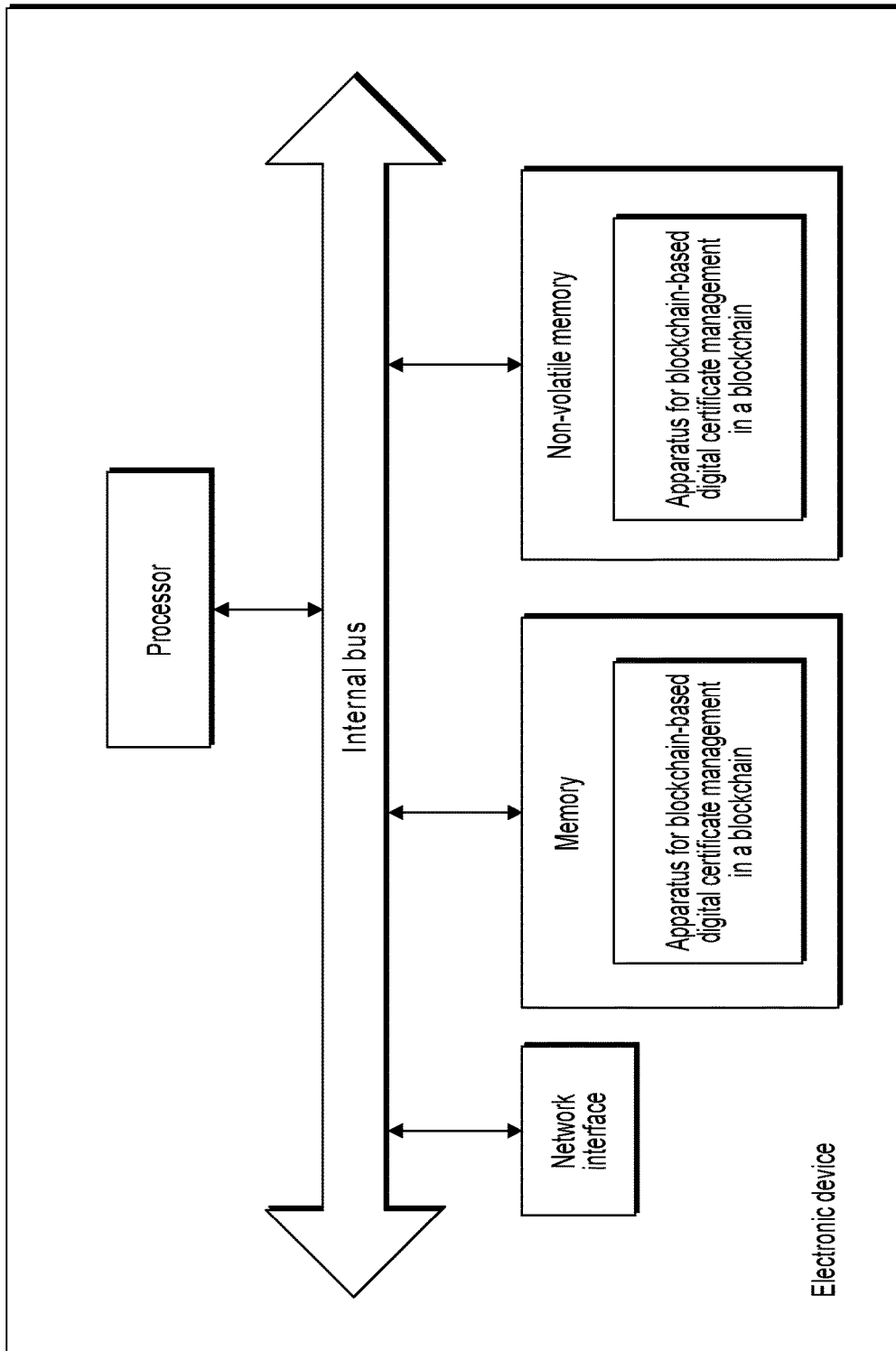
FIG. 9 is a schematic structural diagram illustrating an electronic device for digital certificate management that is applied to a blockchain, according to an implementation of the present application.

FIG. 9 is a schematic structural diagram of an electronic device according to an implementation of the present application. Referring to FIG. 9, the electronic device includes a processor, and optionally further includes an internal bus, a network interface, and a storage in terms of hardware. The storage can include a memory, for example, a high-speed RAM, or can further include a non-volatile memory, for example, at least one magnetic disk memory. Certainly, the electronic device can further include hardware required by another service.

The processor, the network interface, and the storage can be interconnected by using the internal bus. The internal bus can be an ISA bus, a PCI bus, an EISA bus, etc. The bus can be classified into an address bus, a data bus, a control bus, etc. For ease of representation, only a double-headed arrow is used in FIG. 9, but it does not indicate that there is only one bus or only one type of bus.

The storage is configured to store a program. Specifically, the program can include program code, and the program code includes a computer operation instruction. The storage can include a memory and a non-volatile memory, and provide an instruction and data for the processor.

The processor reads the corresponding computer program from the non-volatile memory into the memory and then runs the corresponding computer program, so as to form the apparatus for blockchain-based digital certificate management in terms of logic. The processor executes the program stored in the storage to perform the following operations: receiving a digital certificate of a node and validity status information of the digital certificate that are sent by a CA center; determining, based on the validity status information of the digital certificate, certificate validity information used to reflect the validity status information of the digital certificate; and storing the digital certificate and the certificate validity information in a blockchain, where the digital certificate and the certificate validity information are used to verify, after a second node in the blockchain receives a first communication request sent by a first node, whether a digital certificate of the first node that is included in the first communication request is valid.

The previous method that is performed by the apparatus for blockchain-based digital certificate management and that is disclosed in the previous implementation of the present application can be applied to the processor or can be implemented by the processor. The processor can be an integrated circuit chip, and have a signal processing capability. In an implementation process, steps of the previous method can be completed by using an integrated logic circuit of hardware in the processor or an instruction in a form of software. The previous processor can be a general purpose processor, and include a CPU, an NP, etc., or can be a DSP, an ASIC, an FPGA, or another PLD, a discrete gate or a transistor logic device, or a discrete hardware component. The previous processor can implement or perform methods, steps, and logic block diagrams disclosed in the implementations of the present application. The general purpose processor can be a microprocessor, or the processor can be any conventional processor, etc. The steps of the method disclosed with reference to the implementations of the present application can be directly performed and completed by a hardware decoding processor, or can be performed and completed by using a combination of a hardware module and a software module in a decoding processor. The software module can be located in a mature storage medium in the art, such as a RAM, a flash memory, a ROM, a PROM, an EEPROM, or a register. The storage medium is located in the storage, and the processor reads information from the storage and completes the steps of the previous method by using the hardware of the processor.

The electronic device can further perform the method that is performed by the apparatus for blockchain-based digital certificate management, and implement functions of the apparatus for blockchain-based digital certificate management in the previous implementation. Details are not described in this implementation of the present application.

An implementation of the present application further provides a computer-readable storage medium. The computer-readable storage medium stores one or more programs, the one or more programs include an instruction. The instruction is executed by an electronic device including a plurality of application programs to perform the method that is performed by the apparatus for blockchain-based digital certificate management in the previous implementation, including: receiving a digital certificate of a node and validity status information of the digital certificate that are sent by a CA center; determining, based on the validity status information of the digital certificate, certificate validity information used to reflect the validity status information of the digital certificate; and storing the digital certificate and the certificate validity information in a blockchain, where the digital certificate and the certificate validity information are used to verify, after a second node in the blockchain receives a first communication request sent by a first node, whether a digital certificate of the first node that is included in the first communication request is valid.

An implementation of the present application further provides an apparatus for blockchain-based digital certificate management. The apparatus is applied to a CA center and includes: a sending module, configured to send a digital certificate of a node in a blockchain and validity status information of the digital certificate to the blockchain, so that the blockchain determines, based on the validity status information of the digital certificate, certificate validity information used to reflect the validity status information of the digital certificate, and stores the digital certificate and the certificate validity information, so as to verify, after a second node in the blockchain receives a first communication request sent by a first node, whether a digital certificate of the first node that is included in the first communication request is valid.

Further, the previous apparatus further includes: an application request receiving module, configured to receive a certificate application request sent by the node in the blockchain, where the certificate application request includes application information of the first node and is used to apply to the CA center for the digital certificate of the first node; a receiving and reviewing module, configured to receive and review the application information of the first node; and an issuing and sending module, configured to: when the application information of the first node passes the review, issue the digital certificate to the first node, where validity status information of the digital certificate is validity.

Figure 10:
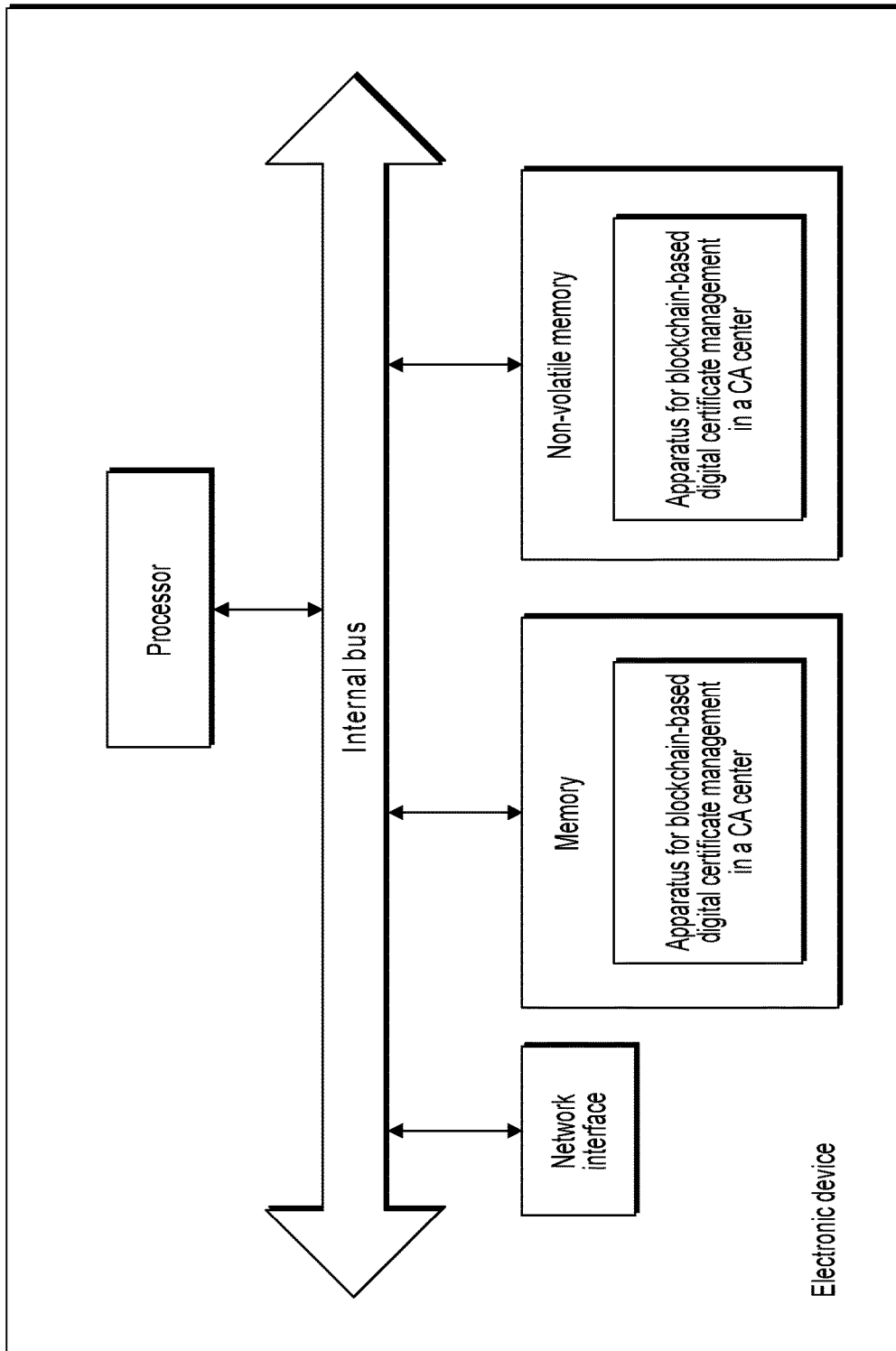
FIG. 10 is a schematic structural diagram illustrating an electronic device for digital certificate management in a CA center, according to an implementation of the present application.

FIG. 10 is a schematic structural diagram of an electronic device according to an implementation of the present application. Referring to FIG. 10, the electronic device includes a processor, and optionally further includes an internal bus, a network interface, and a storage in terms of hardware. The storage can include a memory, for example, a high-speed RAM, or can further include a non-volatile memory, for example, at least one magnetic disk memory. Certainly, the electronic device can further include hardware required by another service.

The processor, the network interface, and the storage can be interconnected by using the internal bus. The internal bus can be an ISA bus, a PCI bus, an EISA bus, etc. The bus can be classified into an address bus, a data bus, a control bus, etc. For ease of representation, only a double-headed arrow is used in FIG. 10, but it does not indicate that there is only one bus or only one type of bus.

The storage is configured to store a program. Specifically, the program can include program code, and the program code includes a computer operation instruction. The storage can include a memory and a non-volatile memory, and provide an instruction and data for the processor.

The processor reads the corresponding computer program from the non-volatile memory into the memory and then runs the corresponding computer program, so as to form the apparatus for blockchain-based digital certificate management in terms of logic. The processor executes the program stored in the storage to perform the following operations: sending a digital certificate of a node in a blockchain and validity status information of the digital certificate to the blockchain, so that the blockchain determines, based on the validity status information of the digital certificate, certificate validity information used to reflect the validity status information of the digital certificate, and stores the digital certificate and the certificate validity information, so as to verify, after a second node in the blockchain receives a first communication request sent by a first node, whether a digital certificate of the first node that is included in the first communication request is valid.

The previous method that is performed by the apparatus for blockchain-based digital certificate management and that is disclosed in the previous implementation of the present application can be applied to the processor or can be implemented by the processor. The processor can be an integrated circuit chip, and have a signal processing capability. In an implementation process, steps of the previous method can be completed by using an integrated logic circuit of hardware in the processor or an instruction in a form of software. The previous processor can be a general purpose processor, and include a CPU, an NP, etc., or can be a DSP, an ASIC, an FPGA, or another PLD, a discrete gate or a transistor logic device, or a discrete hardware component. The previous processor can implement or perform methods, steps, and logic block diagrams disclosed in the implementations of the present application. The general purpose processor can be a microprocessor, or the processor can be any conventional processor, etc. The steps of the method disclosed with reference to the implementations of the present application can be directly performed and completed by a hardware decoding processor, or can be performed and completed by using a combination of a hardware module and a software module in a decoding processor. The software module can be located in a mature storage medium in the art, such as a RAM, a flash memory, a ROM, a PROM, an EEPROM, and a register. The storage medium is located in the storage, and the processor reads information from the storage and completes the steps of the previous method by using the hardware of the processor.

The electronic device can further perform the method that is performed by the apparatus for blockchain-based digital certificate management, and implement functions of the apparatus for blockchain-based digital certificate management in the previous implementation. Details are not described in this implementation of the present application.

An implementation of the present application further provides a computer-readable storage medium. The computer-readable storage medium stores one or more programs, the one or more programs include an instruction. The instruction is executed by an electronic device including a plurality of application programs to perform the method that is performed by the apparatus for blockchain-based digital certificate management in the previous implementation, including: sending a digital certificate of a node in a blockchain and validity status information of the digital certificate to the blockchain, so that the blockchain determines, based on the validity status information of the digital certificate, certificate validity information used to reflect the validity status information of the digital certificate, and stores the digital certificate and the certificate validity information, so as to verify, after a second node in the blockchain receives a first communication request sent by a first node, whether a digital certificate of the first node that is included in the first communication request is valid.

Further, in the electronic device shown in FIG. 10, the executable instruction is executed by the processor to further perform the following operations: receiving a certificate application request sent by the node in the blockchain, where the certificate application request includes application information of the first node and is used to apply to a CA center for the digital certificate of the first node; receiving and reviewing the application information of the first node; and when the application information of the first node passes the review, issuing the digital certificate to the first node, where validity status information of the digital certificate is validity.

The implementations in the present application are described in a progressive way. For same or similar parts in the implementations, refer to the implementations. Each implementation focuses on a difference from other implementations. Particularly, a system implementation is similar to a method implementation, and therefore, is described briefly. For related parts, refer to related descriptions in the method implementation.

Specific implementations of the present application are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product implemented on one or more computer-usable storage media (including but not limited to a magnetic disk memory, a compact disc read-only memory (CD-ROM), and an optical memory) that include computer-usable program code.

The present disclosure is described with reference to the flowcharts and/or block diagrams of the method, the device (system), and the computer program product based on the implementations of the present disclosure. It should be understood that computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable data processing device to generate a machine, so that the instructions are executed by the computer or the processor of another programmable data processing device to generate an apparatus for implementing a specified function in one or more procedures in the flowcharts and/or in one or more blocks in the block diagrams.

These computer program instructions can be stored in a computer-readable memory that can instruct the computer or another programmable data processing device to work in a particular way, so that the instructions stored in the computer-readable memory generate an artifact that includes an instruction apparatus. The instruction apparatus implements a particular function in one or more procedures in the flowcharts and/or in one or more blocks in the block diagrams.

These computer program instructions can be loaded to a computer or another programmable data processing device, so that a series of operations and steps are performed on the computer or another programmable device to generate computer-implemented processing. Therefore, the instructions executed on the computer or another programmable device provide steps for implementing a specified function in one or more procedures in the flowcharts and/or in one or more blocks in the block diagrams.

In a typical configuration, a computing device includes one or more CPUs, an input/output interface, a network interface, and a memory.

The memory can include a volatile memory, a RAM, and/or a non-volatile memory, etc. in a computer-readable medium, for example, a ROM or a flash memory. The memory is an example of the computer-readable medium.

The computer-readable medium includes persistent, non-persistent, movable, and unmovable media that can store information by using any method or technology. The information can be a computer-readable instruction, a data structure, a program module, or other data. A computer storage medium includes but is not limited to a phase change RAM (PRAM), a static RAM (SRAM), a dynamic RAM (DRAM), a RAM of another type, a ROM, an EEPROM, a flash memory or another memory storage device, a CD-ROM, a digital versatile disc (DVD), or another optical memory, a cassette, a magnetic disk, or another magnetic storage device or any other non-transmission medium. The computer storage medium can be configured to store information that can be accessed by a computing device. Based on a definition in this specification, the computer-readable medium does not include computer-readable transitory media such as a modulated data signal and a carrier.

It should be further noted that, the term "include", "comprise", or any other variant is intended to cover non-exclusive inclusion, so that a process, a method, a commodity, or a device that includes a series of elements not only include these elements, but also includes other elements that are not expressly listed, or further includes elements inherent to such a process, method, commodity, or device. An element preceded by "includes a . . . " does not, without more constraints, exclude the existence of additional identical elements in the process, method, commodity, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product implemented on one or more computer-usable storage media (including but not limited to a magnetic disk memory, a CD-ROM, and an optical memory) that include computer-usable program code.

The previous descriptions are merely implementations of the present application, and are not intended to limit the present application. A person skilled in the art can make various modifications and changes to the present application. Any modifications, equivalent replacements, improvements, etc. made within the spirit and principle of the present application shall fall within the protection scope of the claims of the present application.

Figure 11:
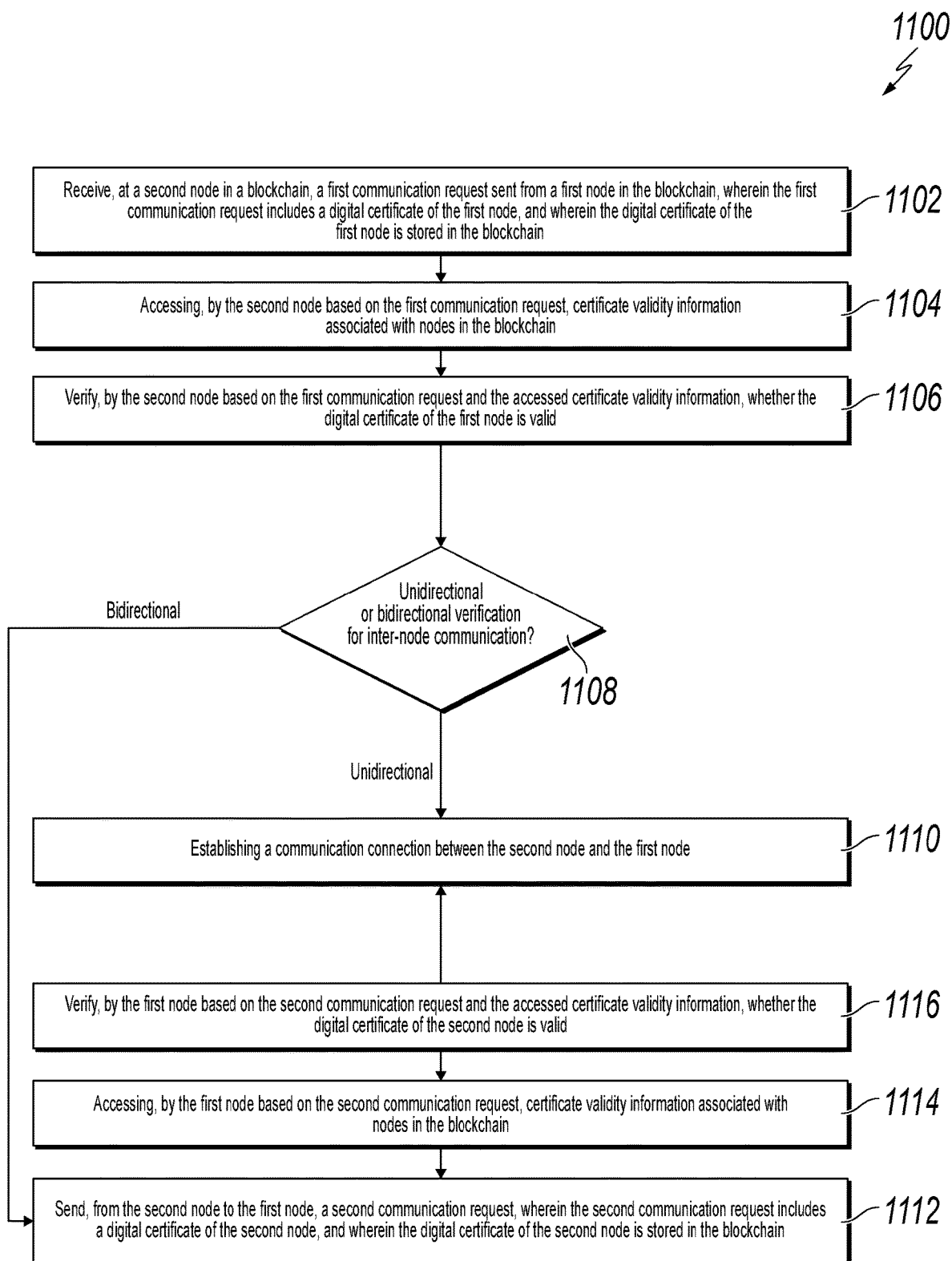
FIG. 11 is a flowchart illustrating an example of a computer-implemented method for communication between blockchain nodes, according to an implementation of the present disclosure.

FIG. 11 is a flowchart illustrating an example of a computer-implemented method 1100 for communication between blockchain nodes, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1102, a first communication request is received at a second node in a blockchain, where the first communication request is received from a first node in the same blockchain. The first and second nodes described herein can be any two different nodes in a blockchain. When the first node expects to communicate with the second node, the first node can initiate the described process. Here, the first communication request can include a digital certificate of the first node to be used by the second node in verifying the identity of the first node. Further, the digital certificate of the first node is stored in the blockchain. From 1102, method 1100 proceeds to 1104.

At 1104, the second node can access, based on the first communication request, a set of certificate validity information associated with nodes in the blockchain. The certificate validity information can store or write information identifying particular digital certificates stored in the blockchain as valid or invalid (for example, revoked digital certificates). In some instances, the certificate validity information can be updated over time as new validity information is received, such as from a certificate authority. In some instances, when a digital certificate of a node is received prior to the operations of 1102, the digital certificate of the node is stored in the blockchain. Further, a set of certificate validity information based on the digital certificate and used to reflect the validity status information of the received digital certificate and the associated node are also stored in the blockchain. In doing so, the digital certificate can be verified using tamper-resistant information to ensure correctness and accuracy of the verification result without requiring further queries outside of the blockchain, thus ensuring communication security of the nodes within the blockchain. In some instances, the certificate validity information can include a valid certificate list and a revoked certificate list, where the lists can be used to determine a validity status of a particular node and digital certificate. From 1104, method 1100 proceeds to 1106.

At 1106, based on the first communication request and the accessed certificate validity information, the second node verifies whether the digital certificate of the first node is valid. To verify whether the digital certificate of the first node is valid, the second node may be able to directly read the certificate validity information locally stored in the node without a need to remotely invoke the certificate validity information stored in a certificate authority (CA) center. Verification can include determining whether the first node and its digital certificate are included in a valid certificate list or an invalid certificate list as stored in the local certificate validity information. If the digital certificate of the first node is determined to be valid, method 1100 can continue at 1108. If the digital certificate of the first node is determined to be invalid, method 1100 end, as the digital certificate of the first node cannot be verified as valid.

At 1108, a determination is made as to whether a communications protocol for inter-nodal communication (for example, between the first and second node) is unidirectional or bidirectional. If the communications protocol requires a unidirectional verification, then method 1100 continues at 1110. If the communications protocol requires a bidirectional verification, method 1100 proceeds to 1112. In the unidirectional verification, the verification of the validity of the digital certificate of the first node is sufficient to establish a communication connection between the second node and the first node. In the bidirectional verification, the first node must also verify the second node before the communication connection can be established.

At 1112, in the bidirectional verification implementation, a second communication request is sent from the second node to the first node, where the second communication request includes the digital certificate of the second node, wherein the digital certificate of the second node is stored in the same blockchain as the two nodes. The second communication request can be sent in response to successfully verifying the validity of the first node, or the second communication request can be sent in response to receiving the first communication request. In some instances, the second communication request can be sent regardless of whether the first node is determined to be valid or not. From 1112, method 1100 proceeds to 1114.

At 1114, the first node, based on the second communication request, can access the certificate validity information, similar to the operations performed by the second node at 1104. At 1116, the first node can verify, based on the second communication request and the accessed certificate validity information, whether the digital certification of the second node is valid, similar to the operations performed by the first node at 1106. If the digital certificate of the second node is invalid, the communication connection may not be established. If, however, the digital certificate of the second node is verified as valid, method 1100 can proceed to 1110.

At 1110, a communication connection between the second node and the first node can be established based on the verification(s).

In some instances, one or more digital certificates associated with particular nodes may be revoked by a CA which previously issued the digital certificate. In those instances, the validity status information of the digital certificate is changed from "valid" to "invalid" (or "revoked"). The CA can then send, to the blockchain, an instruction to update the validity status information of the digital certificate for a particular node. Upon receipt of the instructions, the stored digital certificate can be updated, and the certificate authority information can be updated to reflect the current status of the node's digital certificate. Such information can be stored in the blockchain and used for future interactions.

In some instances, the communication connection is established between the nodes in the blockchain by using the SSL protocol or the TLS protocol. Accordingly, the first communication request received by the second node is sent by the first node based on the SSL protocol or the TLS protocol, and an encrypted communication channel is established between the nodes. The network connection can be encrypted at a transmission layer by using the SSL protocol or the TLS protocol to ensure data transmission security. By using a data encryption technology, it can be further ensured that data is not intercepted or eavesdropped on in a network transmission process. After 1110, method 1100 stops.

Implementations of the subject matter described in this specification can be implemented so as to realize particular advantages or technical effects. For example, implementations of the described subject matter use the benefits of the blockchain, such as decentralization, openness and transparency, and tamper-resistance, to ensure that security is maintained. Even if the CA center is hacked, the hacker cannot tamper with the digital certificate and the certificate validity information that are stored in the blockchain, and therefore, cannot use the invalid digital certificate to join in the blockchain. The validity information of a certificate is stored in the blockchain and can correctly reflect the validity status information of a node certificate. Therefore, by using the validity information of a certificate to verify whether the certificate of the node is valid, an unauthorized node can be prevented from joining in the blockchain to ensure the security of the communication between blockchain nodes and further improve the security of the blockchain network.

In the implementations of the present application, the digital certificate of each node in the blockchain and the previous certificate validity information are stored in the blockchain that contains the node, and the digital certificate can be stored in the blockchain by writing the digital certificate into the blockchain. Therefore, in the implementations of the present application, characteristics of the blockchain, such as decentralization and tamper-resistance, can be used to prevent the hacker from tampering with the digital certificate and the certificate validity information that reflects the validity status information of the digital certificate to ensure that a certificate validity verification result is correct and accurate, and thereby ensure security and stability of the blockchain network. In addition, in this implementation of the present application, when verifying validity of the digital certificate, the second node can directly read the certificate validity information that is locally stored in the node without a need to remotely invoke the certificate validity information stored in the CA center. Based on this, the speed and security of validity verification are improved. In addition, by locally invoking information such as certificate validity information, single point dependency of the blockchain on the CA center can be eliminated and reliability of the blockchain network is further improved.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
receiving, at a first node in a blockchain, from a certificate authority distinct from the blockchain, a digital certificate of a second node in the blockchain and new validity status information of the digital certificate,
wherein the digital certificate comprises at least one of a certificate version number, certificate holder information, certificate authority information, and a certificate validity period;
storing, by the first node, the digital certificate in the blockchain;
accessing, by the first node, certificate validity information associated with each node in the blockchain, wherein the certificate validity information is stored in the blockchain, and wherein the certificate validity information reflects validity status information of digital certificates of each node in the blockchain;
determining, by the first node, that the new validity status information comprises certificate revocation information; and
in response to determining that the new validity status information comprises certificate revocation information, updating the certificate validity information to indicate that the digital certificate is invalid.

2. The computer-implemented method of claim 1, comprising:
receiving, by the first node, from the second node, a communication request, wherein the communication request comprises the digital certificate;
accessing the certificate validity information stored on the blockchain; and
determining, based on the certificate validity information, that the digital certificate is invalid.

3. The computer-implemented method of claim 2, wherein the communication request is sent by the second node based on Secure Sockets Layer (SSL) protocol or Transport Layer Security (TLS) protocol.

4. The computer-implemented method of claim 1, wherein the certificate validity information comprises a valid certificate list and a revoked certificate list.

5. The computer-implemented method of claim 4, wherein updating the certificate validity information comprises updating the revoked certificate list to indicate that the digital certificate is invalid.

6. A non-transitory, computer-readable medium storing one or more instructions executable by a computer system to perform operations comprising:
receiving, at a first node in a blockchain, from a certificate authority distinct from the blockchain, a digital certificate of a second node in the blockchain and new validity status information of the digital certificate,
wherein the digital certificate comprises at least one of a certificate version number, certificate holder information, certificate authority information, and a certificate validity period;
storing, by the first node, the digital certificate in the blockchain;
accessing, by the first node, certificate validity information associated with each node in the blockchain, wherein the certificate validity information is stored in the blockchain, and wherein the certificate validity information reflects validity status information of digital certificates of each node in the blockchain;
determining, by the first node, that the new validity status information comprises certificate revocation information; and
in response to determining that the new validity status information comprises certificate revocation information, updating the certificate validity information to indicate that the digital certificate is invalid.

7. The non-transitory, computer-readable medium of claim 6, wherein the operations comprise:
receiving, by the first node, from the second node, a communication request, wherein the communication request comprises the digital certificate;
accessing the certificate validity information stored on the blockchain; and
determining, based on the certificate validity information, that the digital certificate is invalid.

8. The non-transitory, computer-readable medium of claim 7, wherein the communication request is sent by the second node based on Secure Sockets Layer (SSL) protocol or Transport Layer Security (TLS) protocol.

9. The non-transitory, computer-readable medium of claim 6, wherein the certificate validity information comprises a valid certificate list and a revoked certificate list.

10. The non-transitory, computer-readable medium of claim 9, wherein updating the certificate validity information comprises updating the revoked certificate list to indicate that the digital certificate is invalid.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, at a first node in a blockchain, from a certificate authority distinct from the blockchain, a digital certificate of a second node in the blockchain and new validity status information of the digital certificate,
wherein the digital certificate comprises at least one of a certificate version number, certificate holder information, certificate authority information, and a certificate validity period;
storing, by the first node, the digital certificate in the blockchain;
accessing, by the first node, certificate validity information associated with each node in the blockchain, wherein the certificate validity information is stored in the blockchain, and wherein the certificate validity information reflects validity status information of digital certificates of each node in the blockchain;
determining, by the first node, that the new validity status information comprises certificate revocation information; and
in response to determining that the new validity status information comprises certificate revocation information, updating the certificate validity information to indicate that the digital certificate is invalid.

12. The computer-implemented system of claim 11, wherein the operations comprise:
receiving, by the first node, from the second node, a communication request, wherein the communication request comprises the digital certificate;
accessing the certificate validity information stored on the blockchain; and
determining, based on the certificate validity information, that the digital certificate is invalid.

13. The computer-implemented system of claim 12, wherein the communication request is sent by the second node based on Secure Sockets Layer (SSL) protocol or Transport Layer Security (TLS) protocol.

14. The computer-implemented system of claim 11, wherein the certificate validity information comprises a valid certificate list and a revoked certificate list.

15. The computer-implemented system of claim 14, wherein updating the certificate validity information comprises updating the revoked certificate list to indicate that the digital certificate is invalid.

* * * * *